2,955,061
FLUORIDE COATING ON ZIRCONIUM

Herbert A. H. Jenkins, Dennis B. Freeman, and George R. King, Brentford, England, assignors to The Parker Rust Proof Company, Detroit, Mich.

No Drawing. Filed Aug. 2, 1957, Ser. No. 675,827

5 Claims. (Cl. 148—6.14)

This invention relates to the formation of complex fluoride coatings on surfaces of zirconium and alloys consisting predominately of zirconium. Such coatings are formed in accordance with this invention by treating the surfaces with an aqueous solution containing fluoride ions and potassium ions and having a pH between 2 and 6. The solution must contain fluoride ions in an amount between M/8 and 6M, preferably between M and 5M/2, and must contain potassium ions in an amount between M/8 and 2M, preferably between M/2 and M. The preferred pH range is 3 to 5. M is defined as a molar solution.

By treating the surfaces with these solutions, and in particular with solutions having concentrations within the preferred ranges, grey-colored firmly adherent coatings are formed. These coatings, while primarily of value of facilitating cold-working of the coated metal, also serve as a base for paints and increase the corrosion resistance.

The necessary acidity for the solutions can be provided by any acid that is strong enough to ensure attainment of the required pH, provided that if the acid has oxidizing properties, for example is nitric acid, its concentration must be limited. If, too great a quantity of a strong oxidizing agent is used the surface is passivated with the result that no coating is formed. The prefered acids are hydrofluoric and sulphuric acids or their equivalents, for example, bifluorides, bisulphates and sulphamates.

The simplest solutions for use in this invention consist of a mixture of hydrofluoric acid and potassium fluoride in water.

Up to half the potassium can be replaced by other alkali metals or ammonium. If there is less potassium than this, coating formation becomes very slight and may give place to a pickling action.

Divalent tin, trivalent arsenic, pentavalent vanadium and hexavalent chromium may be included in the solution with beneficial results. For example, 0.25% stannous chloride reduces the coating time of the solution M/2 in KF and M in HF from more than 15 minutes to 3 minutes, and at the same time improved the adhesion of the coating. 0.25 to 0.5% sodium arsenate also reduces the coating time but tends to reduce the adhesion of the coating. 0.2% sodium vanadate and 0.25% sodium chromate increase the adhesion but have substantially no effect on coating time.

The formation of coatings according to this invention gives rise to heavy gassing in the initial stages; the gassing may even be violent at pH's below 3. After the initial burst, gassing dies down but does not disappear completely. Nitrate ions help to reduce this gassing and can conveniently be present in the solutions. For example, in a solution M/2 in KF and M in HF, 1% $KNO_3$ reduced the period of violent gassing from more than 15 minutes to 4 minutes.

The surfaces to be coated must be clean before treatment according to the invention. Descaling and pickling of the surfaces can be carried out in a mixture of nitric and hydrofluoric acids. If the scale is heavy it can be removed by shot blasting and the descaled surfaces then pickled in the mixed acid bath.

By way of example three zirconium tubes were descaled by shot-blasting, pickled in a hydrofluoric acid-nitric acid mixture and treated by immersion in the following solutions:

| I | II | III |
|---|---|---|
| 1.25% $KHSO_4$<br>5.0% KF | 1.1% $NaHSO_4$<br>5.0% KF | 3% KF<br>2% HF<br>0.25% $SnCl_2H_2O$ |

Solution I had a pH of about 4 and produced an adherent dark grey coating in 5 minutes. Solution II produced adherent grey coatings in 5 minutes which were slightly dusty. Solution III produced smooth, adherent, light gray coatings in 5 minutes.

We claim:

1. An aqueous acidic solution for producing a coating on surfaces of zirconium and zirconium base alloys having a pH between 2 and 6 and consisting essentially of the fluoride ion in concentrations between M/8 and 6M and potassium ion in concentrations between M/8 and 2M and a metal selected from the group consisting of divalent tin, trivalent arsenic, pentavalent vanadium and hexavalent chromium.

2. An aqueous acidic solution as set forth in claim 1 in which the tin, arsenic, vanadium or chromium are added in the form of stannous chloride, sodium arsenate, sodium vanadate or sodium chromate, respectively.

3. An aqueous acidic solution for producing a coating on surfaces of zirconium and zirconium base alloys having a pH between 2 and 6 and consisting essentially of the fluoride ion in concentrations between M/8 and 6M, potassium ion in concentration between M/8 and 2M except that up to one-half of the potassium ion is replaced by an equivalent amount of one or more other alkali metals including ammonium ion, and nitrate ion, and the amount of the potassium ion being not less than ⅛ M.

4. A method in accordance with claim 3 wherein said fluoride ion is in concentration between M and 5M/2 and potassium ion is in concentration between M/8 and 2M.

5. A metal article of the class consisting of zirconium and zirconium base alloys having on the surface thereof a coating resulting from the use of the process of claim 3.

References Cited in the file of this patent

UNITED STATES PATENTS

| 1,957,354 | Prier | May 1, 1934 |
| 2,322,208 | Loose et al. | June 22, 1943 |
| 2,489,152 | Panepinto | Nov. 22, 1949 |
| 2,711,364 | Beach | June 21, 1955 |

OTHER REFERENCES

American Machinist, June 11, 1951 (page 152 relied upon).